Figure 3:
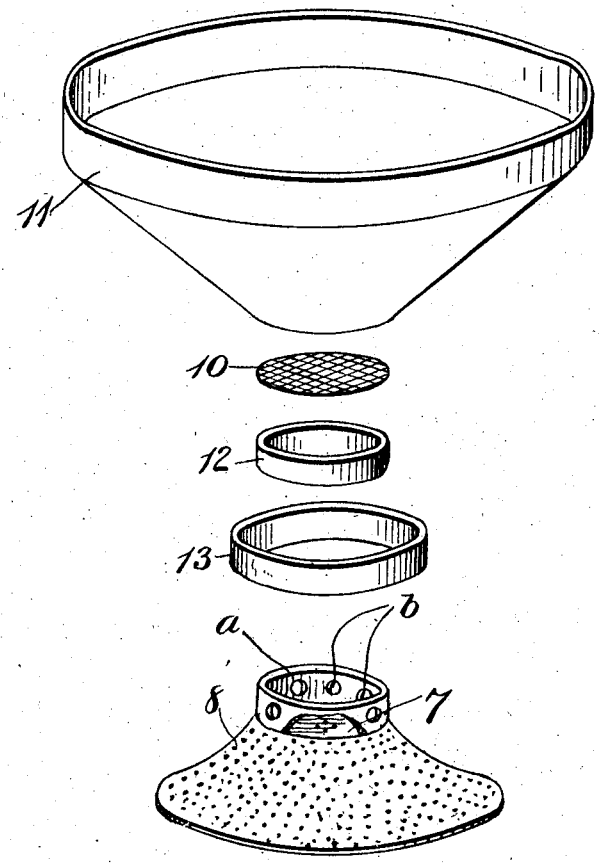

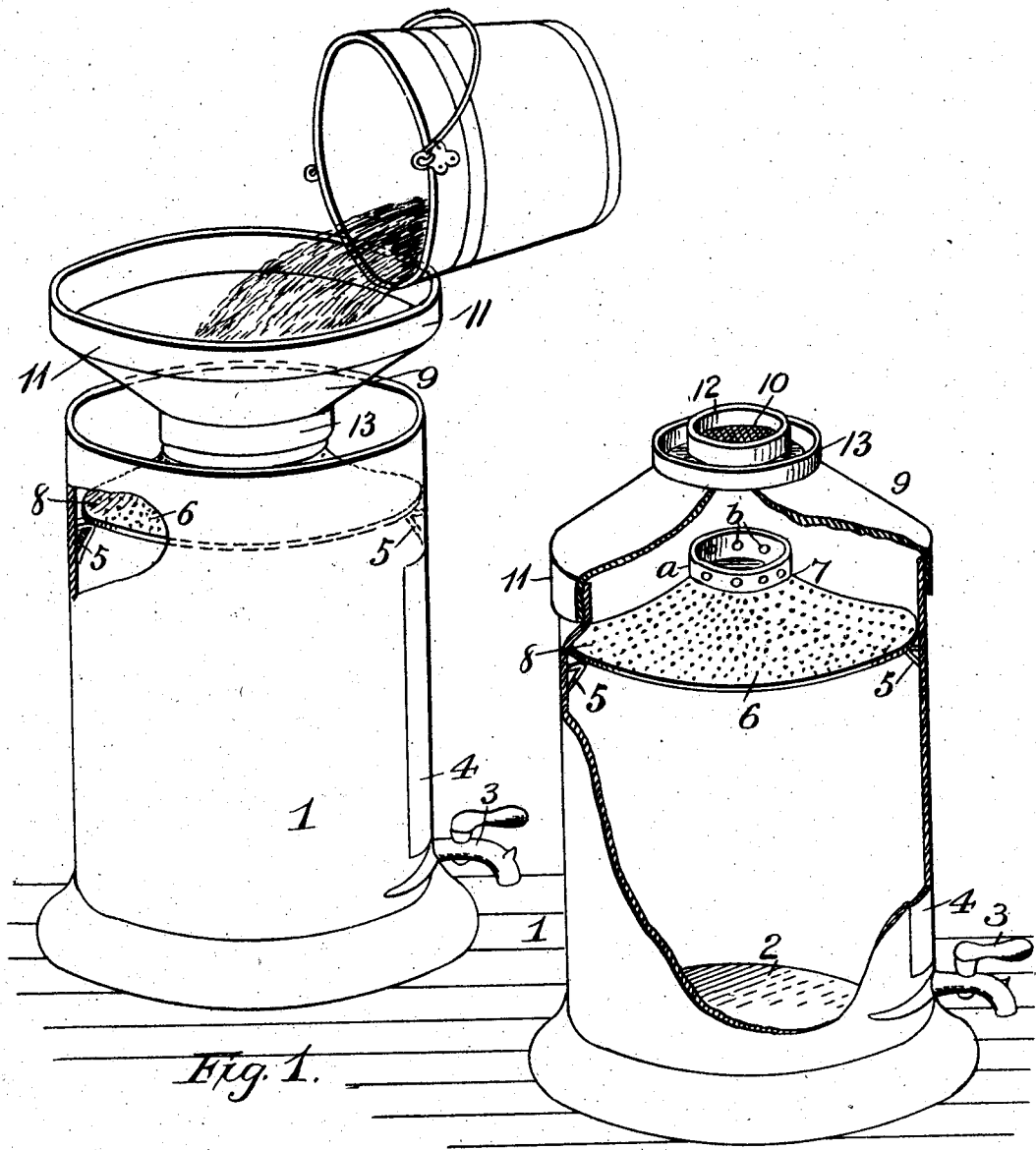

No. 834,366. PATENTED OCT. 30, 1906.
T. A. DAVIS.
CREAM SEPARATOR.
APPLICATION FILED APR. 27, 1906.

2 SHEETS—SHEET 2.

Witnesses:

Inventor:
Thomas A. Davis,
By
Attorneys

UNITED STATES PATENT OFFICE.

THOMAS ALBERT DAVIS, OF FINDLAY, ILLINOIS.

CREAM-SEPARATOR.

No. 834,366.  Specification of Letters Patent.  Patented Oct. 30, 1906.

Application filed April 27, 1906. Serial No. 314,084.

*To all whom it may concern:*

Be it known that I, THOMAS ALBERT DAVIS, a citizen of the United States, residing at Findlay, in the county of Shelby and State of Illinois, have invented certain new and useful Improvements in Cream-Separators, of which the following is a specification.

My invention pertains to improvements in what may be termed "creaming" devices, otherwise styled "cream-separators." Its object is to principally comminute or divide up the milk initially into fine particles to aid the separation or precipitation of the cream from the body of the milk, also to permit the ready elimination or escape from the can contents of the animal "heat," and to provide for accomplishing the aforesaid ends in a simple, economic, and effective manner.

Said invention consists in certain features, substantially as hereinafter fully disclosed, and specifically pointed out by the claims.

In the accompanying drawings, Figure 1 is a perspective view illustrating the preferred embodiment of my invention with parts of the same broken away. Fig. 2 is a like broken-away view with the parts differently assembled or as when the cam is closed. Fig. 3 shows, disassembled, perspective views of the principal parts or features of the invention, which will be fully explained later.

In carrying out my invention I employ the usual type of milk-can 1, the same having an inner inclined bottom-surface 2, sloping toward the usual draw-off faucet 3, the purpose of which is obvious. Said can is also suitably furnished in its side with an observation-glass 4, preferably just above the faucet 3, and within said can, near its upper end, are suitably secured offsets or projections 5, upon which is supported or designed to rest a foraminous or finely-perforated diaphragm or strainer 6. This latter is preferably slightly sloped from a central cup-shaped portion 7 and concaved toward its circumference to provide for the requisite spreading of the milk and cream thereover and yet prevent the too rapid passing of the same therethrough for the effective separation of these, as will be readily appreciated. The central cup-shaped portion 7 of the strainer 6 has at about its center a number or group of perforations 8 for the draining off or therethrough of any cream or milk which would otherwise remain thereon. Secured to the strainer 6 immediately around its central plate portion is an upstanding collar or annulus *a*, forming a receptacle and having a continuous circular series of apertures or perforations *b* through it, the purpose of which will appear later. Said can 1 has a cover or closure 9, preferably tapered toward its center, but with the inclination stopping some distance from the otherwise vanishing-point, thus forming practically a truncated cone, with the top thereof formed of a wire cloth or strainer 10 for an obvious purpose, as when the position of the cover is inverted with relation to the can, as seen in Fig. 1. Said cover or closure has the usual flange or skirt 11 to encompass or fit around the upper edge of the can when said cover or closure is placed thereon for closing it, as indicated in Fig. 2. Also said closure or cover has secured to it just around the strainer 10 an annulus or neck-like member 12, and spaced off from this neck or annulus and secured to said cover is an additional annulus or ring 13, which, however, has its outer or upper edge much lower than the aforesaid like member or annulus. Between these is received the deep perforated collar *a* of the foraminous diaphragm or strainer 6 when the closure or cover 9 is inverted or used as a funnel, as indicated by Fig. 1. The collar *a*, however, is not in contact with either the annulus 12 or the like part 13 and is also of such depth as to retain the funnel now formed by the cover, as stated, off the strainer 6, whereby it will be noted that the milk or cream passing interiorly of the collar *a* as it is being thus poured will rise in the latter and flow out through its perforations or apertures *b* and intermediately thereof and the annulus or ring 13 of the funnel or cover 9 down upon and spread out over and pass through the strainer 6 below. It is noted that, as is well known, the can 1 is supplied with a quantity of water to provide for the precipitation of the milk or heavier ingredient, the cream remaining or being borne upon the surface of the water, thus resulting in the separation of the cream and milk as required. It is further observed that the perforations in the top of the strainer therein allows the animal heat to escape when the separation process may have been concluded and the can has been set aside.

I claim—

1. A device of the character described, comprising a can or vessel provided at a suitable point below its upper end with a strainer and having an upstanding collar-formed receptacle around its strainer, and an invertible funnel-shaped closure or cover effective for delivering into said receptacle, and provided with a central strainer also guarded by a collar or annulus, said closure also having an additional annulus or rim beyond the latter like part and of less height or depth than the same.

2. A device of the character described, comprising a vessel or can equipped with a strainer subdividing it at a suitable point in its cross-section and having around a substantially imperforate central portion thereof an upstanding collar forming a receptacle, having a continuous or circular series of overflow apertures or perforations delivering upon the foraminous surface of said strainer, and an invertible funnel-shaped closure or cover for delivering into said receptacle and provided with a central strainer guarded by a collar or annulus, said closure also having an additional annulus or rim beyond the latter like part and of less height or depth than the same.

In testimony whereof I have signed my name to this specification in the presence of two subscribing witnesses.

THOMAS ALBERT DAVIS.

Witnesses:
C. B. DAVIS,
J. M. WYCKOFF.